US008724530B2

United States Patent
Ho et al.

(10) Patent No.: US 8,724,530 B2
(45) Date of Patent: May 13, 2014

(54) WIRELESS MESH NETWORKS WITH IMPROVED RADIO SEGREGATION

(75) Inventors: Wang Hei Ho, Hong Kong (HK); Pak Kit Lam, Hong Kong (HK); Han Joo Chong, Hong Kong (HK)

(73) Assignee: P2 Mobile Technologies Limited, Hong Kong (HK)

( * ) Notice: Subject to any disclaimer, the term of this patent is extended or adjusted under 35 U.S.C. 154(b) by 161 days.

(21) Appl. No.: 13/396,613

(22) Filed: Feb. 15, 2012

(65) Prior Publication Data

US 2013/0107760 A1    May 2, 2013

(30) Foreign Application Priority Data

Oct. 28, 2011   (HK) .................................. 11111667

(51) Int. Cl.
*H04B 7/00*   (2006.01)
(52) U.S. Cl.
USPC ...................................................... 370/310.2
(58) Field of Classification Search
USPC ................. 370/224, 238, 252, 256, 259, 311, 370/310.2, 328, 329, 458
See application file for complete search history.

(56) References Cited

U.S. PATENT DOCUMENTS

| 8,345,609 | B2* | 1/2013 | Patil et al. | 370/329 |
| 8,514,776 | B2* | 8/2013 | Robinson et al. | 370/328 |
| 2005/0208949 | A1* | 9/2005 | Chiueh | 455/452.2 |
| 2008/0137537 | A1* | 6/2008 | Al-Manthari et al. | 370/238 |
| 2010/0278057 | A1* | 11/2010 | Robinson et al. | 370/252 |
| 2010/0278118 | A1* | 11/2010 | Gossain et al. | 370/329 |
| 2011/0032883 | A1* | 2/2011 | Patil et al. | 370/329 |
| 2011/0090803 | A1* | 4/2011 | Etkin et al. | 370/252 |
| 2013/0007264 | A1* | 1/2013 | Effros et al. | 709/224 |

* cited by examiner

*Primary Examiner* — Hassan Phillips
*Assistant Examiner* — Ajay Cattungal

(57) ABSTRACT

A wireless mesh network comprises a first branch of access nodes and a second branch of access nodes. The first and second branches sharing a common access node and each access node is for facilitating wireless interconnection between a device and the network. The minimum separation distance ($d_1$) between an access node in the first branch and an access node in the second branch is greater than $K^{1/\alpha}d_0$, wherein $d_0$ is the separation distance between a transmitting node and a receiving node in the first branch, K is the signal-to-interference ratio (SIR) and $\alpha$ is the path loss exponential.

19 Claims, 4 Drawing Sheets

WIRELESS MESH NETWORKS WITH IMPROVED RADIO SEGREGATION

FIELD OF THE INVENTION

The present disclosure relates to wireless communication networks, and more particularly to wireless mesh networks.

BACKGROUND OF THE INVENTION

Wireless mesh network (WMN) are useful in many applications because of their low up-front costs, flexibility in incremental deployment and ease of maintenance. For example, WMN are widely used in community networks, enterprise networks, video surveillance, voice communications and localization services. Wireless mesh network architecture is often seen as a first step towards providing cost effective and dynamic high-bandwidth networks over a specific coverage area. A wireless mesh network can be seen as a special type of wireless ad-hoc network using IEEE 802.11 ad-hoc protocol for backbone infrastructure. A wireless mesh network often has a more planned configuration, and may be deployed to provide dynamic and cost effective connectivity over a certain geographic area. An ad-hoc network, on the other hand, is formed ad hoc when wireless devices come within communication range of each other.

However, WMN are vulnerable to throughput degradation due to their multi-hop nature, and such throughput degradation is due primarily to contention or half-duplex communication in single-radio networks. This is because an access node with a single wireless interface cannot transmit and receive packets simultaneously—it must first receive and then transmit in order to relay a packet. The channel time required to relay a packet is thus at least twice the amount of time for sending a packet directly from the source to the destination. Moreover, the carrier-sensing mechanism in IEEE 802.11 MAC may prevent simultaneous transmissions on the same channel, and radio interference (or collision) may occur when the carrier sensing fails to prevent interfering links from transmitting simultaneously. These will all affect the multi-hop throughput performance and hence limit the coverage of WMN.

SUMMARY OF INVENTION

Accordingly, there is provided a wireless mesh network comprising a first branch of nodes and a second branch of nodes sharing a common access node; wherein the minimum separation distance ($d_1$) between an access node in the first branch and an access node in the second branch is greater than $K^{1/\alpha}d_0$, wherein $d_0$ is the separation distance between a transmitting node and a receiving node in the first branch, K is the signal-to-interference ratio(SIR) and $\alpha$ is the path loss exponential.

In an example Y-shaped network, $d_0$ is the separation distance between the common access node and a first node in the first branch, the first node being most proximal to the common access node.

When the network is adapted for indoor use, $d_1$ is greater than $1.7 d_0$.

In a Y-shaped network topology comprising a third branch of nodes, said third branch also shares the common access node; wherein the access nodes of said first second and third branches most proximal to said common access node are distributed on the vertices of a equilateral triangle with the common access node at the centre.

In another Y-shaped network topology comprising a third branch of nodes, said third branch also shares the common access node; wherein each of the first second and third branches comprises a plurality of nodes distributed along a line, and the first second and third branches are separated by 120 degrees.

In another Y-shaped network topology comprising a third branch of nodes, said third branch also shares the common access node; wherein the access nodes are distributed in Y shape.

In an example, the access nodes of said first second and third branches most proximal to said common access node may use non-overlapping channels for transmission.

The mesh network may be adapted to operate in the 2.4 GHz and 5 GHz band.

In another aspect, there is provided a wireless mesh network comprising a first branch of router nodes, a second branch of router nodes and a third branch of router nodes sharing a common access node; wherein the common router node is adapted to communicate with each of the first, second and third router braches using a different and non-overlapping radio channel.

In such a network, a router branch may comprise a first router node which is in radio communication with the common router node to form a first router leg section, and a second router node which is in radio communication with the first router node of that branch to form a second router leg section; wherein the radio channels of the first and second leg sections of that router branch are different and non-overlapping, and that the radio channel of the second leg section is different to and non-overlapping with any of the radio channels of the first leg sections of the first, second and third router branches.

A wireless mesh network deployed with the above network topologies mitigates the multi-hop throughput degradation problem, thereby providing the possibility of a more extensive wireless coverage at high data rates.

BRIEF DESCRIPTION OF DRAWINGS

Examples of Y-shaped network topology according to the present disclosure and WMN using such Y-shaped network topology will be described below by way of example with reference to the accompanying drawing, in which:—

DETAILED DESCRIPTION OF EMBODIMENTS

Figure 1:
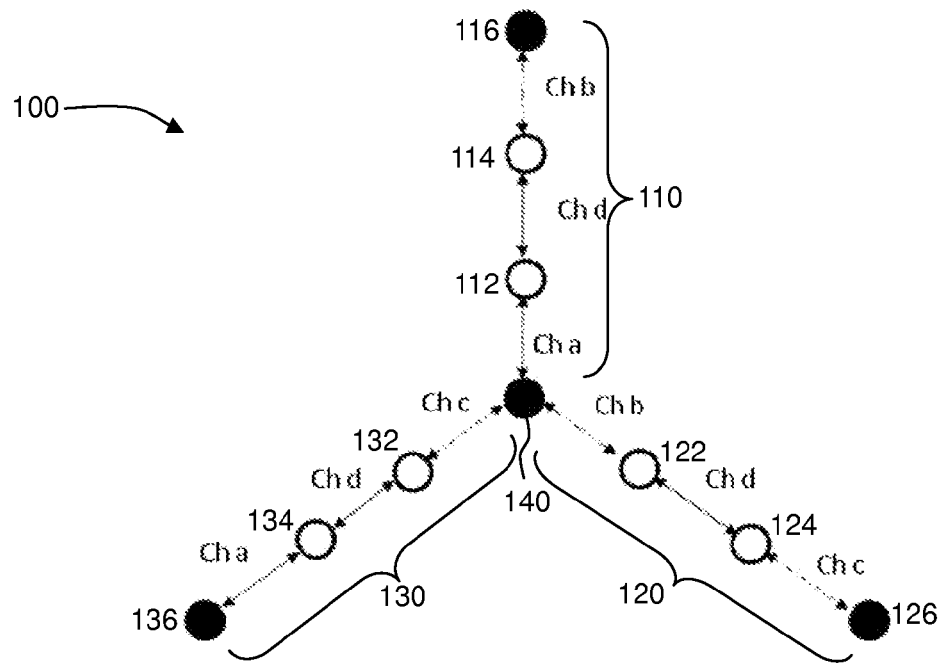
FIG. 1 is a schematic diagram depicting a Y-shaped wireless mesh network (WMN) topology.

A wireless network 100 depicted in FIG. 1 as an example of a wireless mesh network comprises a plurality of wireless routing devices in wireless protocol interconnection. A wireless backbone network is typically used to provide access points so that wireless user devices can be connected to the Internet or enterprise computing resources via a wired backbone and through the access points. A router is an example of routing devices while other devices such as data forwarding devices including data switches or data hubs are regarded as equivalent for the present description.

The exemplary 10-node WMN of FIG. 1 comprises 10 wireless routers nodes each comprising a multiple radio router. The 10 router nodes, designated by node numbers 112, 114, 116, 122, 124, 126, 132, 134, 136, 140, are distributed into three router branches, namely router branches 110, 120, 130 and are connected in data communication to a common wireless router designated by node 140.

Each of the wireless routers is equipped with a plurality of radio frontends to facilitate wireless communication in a plurality of non-overlapping radio channels. Each radio frontend may be a standalone radio receiver or radio transceiver, or a wireless module comprising a plurality of radio devices each configurable as a radio receiver or a radio transmitter selectable from a plurality of non-overlapping radio channels. For example, the wireless router 140 which forms a center node of the WMN 100 of FIG. 1 comprises 4 radio frontends each of which is selectively communicable in any one of the 4 designated channels, namely, channel a, b, c, and d to facilitate improved multi-hop throughput. The plurality of radio channels a, b, c, and d can be selected, for example, from the 23 non-overlapping channels in the 5 GHz band defined in IEEE 802.11a and 802.11n standards. On the other hand, the wireless router 132 in the branch 130, the wireless router 122 in the branch 120, and the wireless router 112 in the branch 110 each comprises two radio frontends and each of the radio frontends is communicable using any one of the 4 designated. For example, the wireless router 132 in the branch 130 is configured to communicate with the central router 140 using channel c and to communicate with the branch router 134 using channel d; and the wireless router 122 in the branch 120 is configured to communicate with the central router 140 using channel b and to communicate with the branch router 124 also using channel d.

When a router is equipped with multiple radios or wireless interfaces, a router node can receive and transmit simultaneously to achieve full-duplex communication. Furthermore, radio interference and collisions can be substantially mitigated by allocating non-overlapping channels to adjacent wireless routers, and links with non-interfering channels can transmit simultaneously to boost the overall throughput.

As depicted in FIG. 1, the common router of the wireless mesh network 100 as designated by router node 140 is wirelessly connected to the first router node 112 of the first router branch 110 using radio channel a, connected to the first router node 122 of the second router branch 120 using radio channel b, and connected to the first router node 132 of the third router branch 130 using radio channel c. As channels a, b, c, are non-overlapping radio channels, risk of radio interference between the wireless routers connected in the first router leg section of the plurality of branches 110, 120, 130 comprising the common access node 140 and the primary routers 112, 122, 132 are mitigated.

To further mitigate radio interference between the wireless router links, a different radio channel, namely channel d, which is non-overlapping with any of the radio channels already used in the first router leg section, is used in the second router leg sections comprising routers 112, 114 in the first router branch; routers 122, 124 in the second router branch; and routers 132, 134 in the third router branch. Furthermore, the radio channel used in the tertiary leg section of a router branch is different to that used in the primary and secondary leg sections of that router branch. For example, channel b is used in the tertiary leg section of the first router branch 110 between wireless routers 114 and 116, while radio channels a and d are used respectively in the first and second leg sections of the first router branch 110. Similarly, channel c is used in the tertiary leg section of the second router branch 120 between wireless routers 124 and 126, while radio channels b and d are used respectively in the first and second leg sections of the second router branch 120. Finally, channel a is used in the tertiary leg section of the third router branch 130 between wireless routers 134 and 136, while radio channels c and d are used respectively in the first and second leg sections of the third router branch 130.

It will be appreciated that apart from the common access node router 140 which requires three radio channels, the other routers in the router branches only require two radio channels. Therefore, wireless routers having 4 selectable channels would provide the adequate number of radio channels for deployment in this network. To provide more radio segregation between the three router branches, the three router branches are deployed such that the first router leg sections of the three router branches are at equal angular distances of 120 degrees separation to each other. In other words, the first router nodes 112, 122, 132 of the three router branches are located at the vertices of an equilateral triangle with the common access node in the centre of the equilateral triangle.

Figure 2:
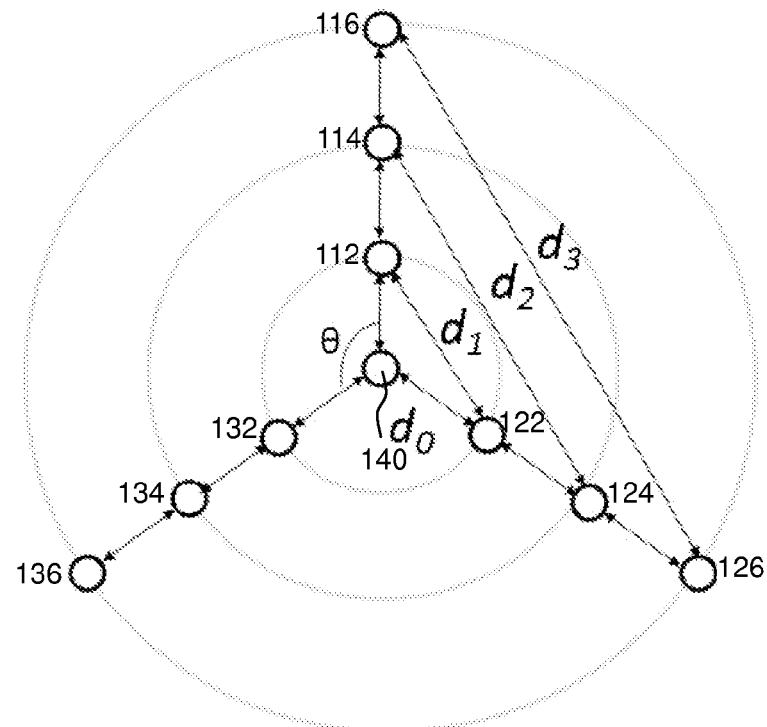
FIG. 2 is a schematic diagram depicting spatial relation between various components of the WMN of FIG. 1.

As shown schematically in FIG. 2, the three first router nodes 112, 122, 132 form the vertices of an equilateral triangle (i.e., $\theta=2\pi/3$), and each of the three first router nodes 112, 122, 132 nodes is equally spaced from the common access node 140 at a distance of $d_0$. The distance ($d_1$) between adjacent first router nodes, for example, between nodes 112 and 122, is $d_1=2d_0*\cos(7/6)=1.731\ d_0$.

In selecting the preferred separation, it is assumed that the following power-transfer relationship: $P(a, b)=k*P_a/r^\alpha$, where $P(a, b)$ is the power received by node b from node a; $P_a$ is the transmit power of node a; r is distance between the two nodes; $\alpha>2$ is the path-loss exponent; and k is a constant. Let $T_i$ and $R_i$ denote the transmitter and receiver of link i. For brevity, we also use $T_i$ and $R_i$ to denote their positions. So, $|a-b|$ denotes the distance between nodes a and b. We also assume that the SIR requirement, K, is such that if $KP(T_2, R_1)>P(T_1, R_1)$, then $T_2$ will interfere with the reception at $R_1$.

Consider two links, link 1 and link 2. If they are using the same transmit power to transmit simultaneously, then link 2 will interfere with link 1's DATA or ACK packets if any of the following happens $$|T_2-R_1|<K^{1/\alpha}|T_1-R_1| \tag{1}$$

$$|T_2-T_1|<K^{1/\alpha}|T_1-R_1| \tag{2}$$

$$|R_2-R_1|<K^{1/\alpha}|T_1-R_1| \tag{3}$$

$$|R_2-T_1|<K^{1/\alpha}|T_1-R_1| \tag{4}$$

In other words, to mitigate interference, the shortest distance between any two nodes in links 1 and 2 must be great than or equal to $K^{1/\alpha}|T_1-R_1|$, which is equal to $K^{1/\alpha}d_0$ in the Y-shape topology. Let us denote it as the interference range, $I_R$. Assume that K=10, which is the default value in ns-2 (http://www.isi.edu/nsnam/ns/), and $\alpha=5$ for indoor environment. Then, $I_R=1.58d_0<1.731\ d_0=d_1$. For outdoor applications, $\alpha$ is 2.

As a result, given any two links in the Y-shaped network topology of FIG. 1 that use the same channel are separated by $d_1$ or more, they are able to transmit simultaneously without any noticeable or material interference. It turns out that the Y-shaped network topology utilise wireless routers having only 4 selectable channels while mitigating conflicts as show in FIG. 1.

Figure 3:
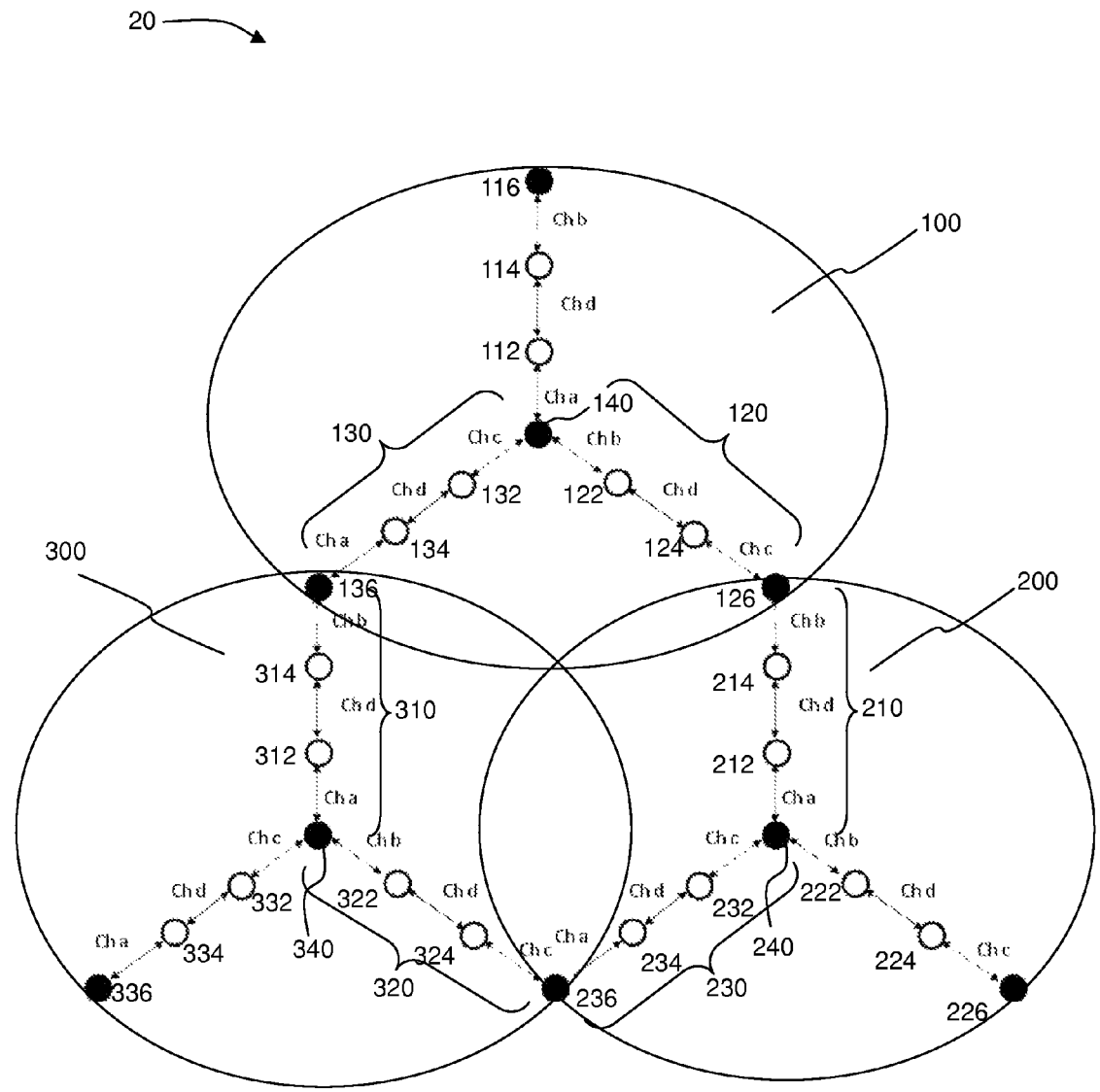
FIG. 3 is a schematic diagram depicting a cellular network comprising a plurality of Y-shaped WMN of FIG. 1.

Furthermore, multiple Y-shaped network topologies as described above can be connected together to provide a more extensive area coverage as shown in FIG. 3. The multiple Y-shaped network 20 of FIG. 3 comprises a first Y-shaped network 100 having a central node router 140, a second Y-shaped network 200 having a central node router 240, and a third Y-shaped network 300 having a central node router 340, wherein the three Y-shaped networks are in networking communication interconnection. The three Y-shaped networks are connected in a toe-to-head or head-to-toe manner such that the most distal node of one branch of one Y-shaped network is connected to the most distal node in one branch of another first Y-shaped network.

As depicted in FIG. 3, the interconnected router branches 120, 210 respectively of the first 100 and the second 200 Y-shaped networks are deployed at an angular distance or separation of 120 degrees to each other to provide more radio segregation. As channels b, c are non-overlapping radio channels used by the router 126 for radio interconnection with the router 214 of the second Y-shaped network and the router 124 of the first Y-shaped network respectively, risks of radio interference between wireless routers connected to the router branch 120 and router branch 210 are mitigated. In this multiple Y-shaped network comprising a regular hexagonal cell whose sides are defined by router branches 120, 130, 210, 230, 320, and 310 and other branches, the branch 210 can be considered as a tertiary branch or leg section of the router branch 120, and the end router 126 of the first Y-shaped network becomes a common access node to the branches 120 and 210. Likewise, the branch 310 can be considered as a tertiary branch or leg section of the router branch 130, and the end router 136 of the second Y-shaped network becomes a common access node to the branches 130 and 310.

To maximise radio segregation between adjacent router branches whereby radio interference is mitigated, the angular separation between router branches are 120 degrees in the above examples. While a 120-degree separation is preferred for a Y-shaped network topology, it will be appreciated that the angular separation between adjacent router branches can be different adjusted according to the actual geometrical deployment. For example, the angular separation between adjacent router branches is set to be 90-degrees for a '+'-shaped network, 180-degrees for a linear shaped network, and 72-degrees for a 5-leg star ('*')-shaped network.

In the examples, example radio channels a, b, c are used by the common access nodes 140, 240, 340 and example radio channel d is by an access node which is wirelessly connected to the common access nodes for wireless communication with a non-common access node more distal from the common access node in order to mitigate radio interference. It should be appreciated that a, b, c, d are mere symbols and other channel allocation schemes beneficial for radio channel segregation can be used without loss of generality.

Figure 4:
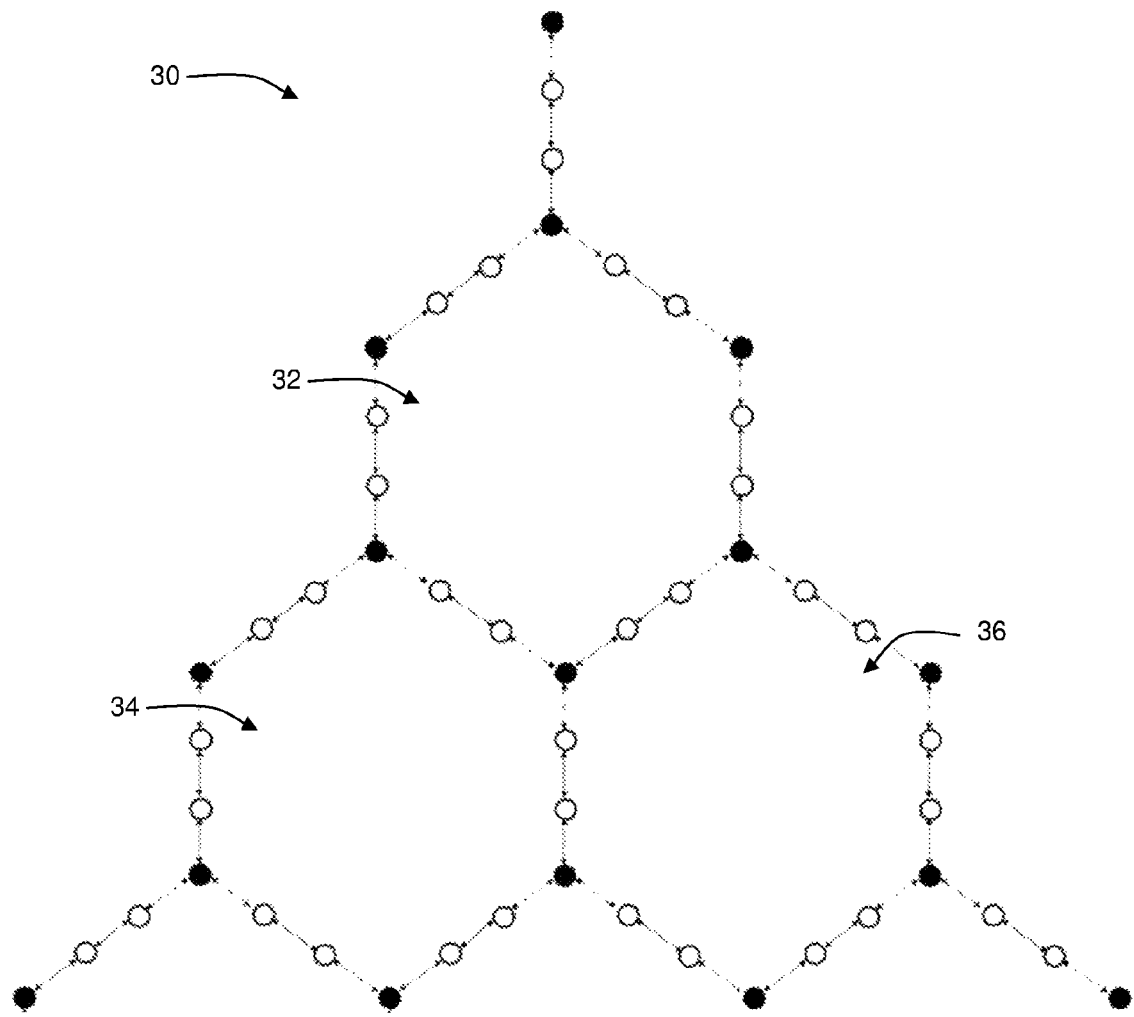
FIG. 4 is a schematic diagram depicting another cellular network comprising a plurality of Y-shaped WMN of FIG. 1 in interconnection.

The multiple Y-shaped network 30 depicted in FIG. 4 comprises six Y-shaped networks collectively defining 3 regular hexagonal cells 32, 34 and 36, and the sides of the regular hexagon are formed by the router branches. Similar to the multiple Y-shaped network 20 of FIG. 3, branches connected to a common access node are deployed at an angular distance or separation of 120 degrees to each other to provide more radio segregation.

Figure 5:
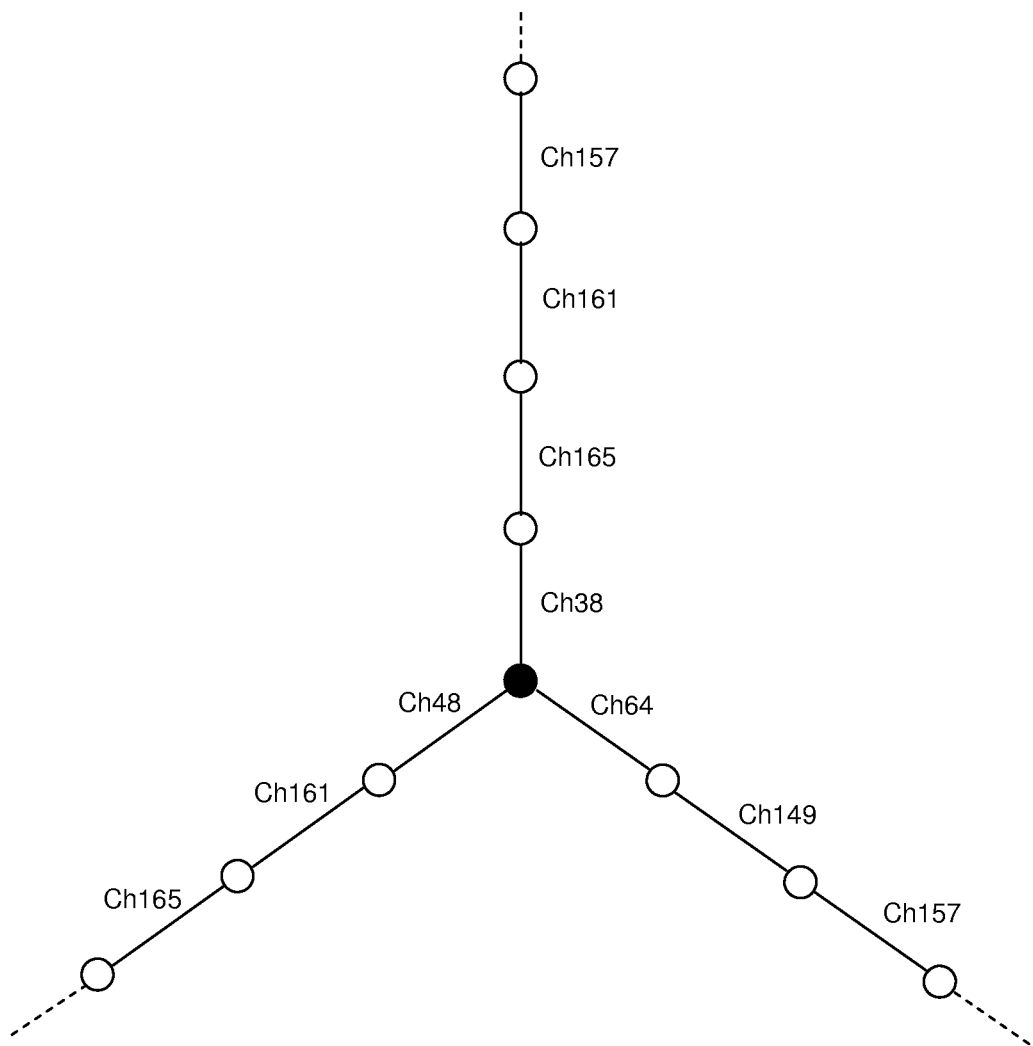
FIG. 5 is schematic diagram showing another example of a multi-Y-shaped WMN.

The Y-shaped network depicted in FIG. 5 shows another example with actual channel allocation for reference.

In this disclosure, nodes are used to mean wireless access nodes unless the context requires otherwise. While the present invention has been described with reference to the above examples, it would be appreciated by persons skilled in the art that the examples are only provided as illustrations to assist understanding and are not meant to restrict scope of invention. For example, while a router branch comprises solely or wireless routers deployed in a linear manner for convenience, the routers can be selectively wireless or wired connected without loss of generality.

The invention claimed is:

1. A wireless mesh network comprising a first branch of access nodes and a second branch of access nodes, the first and second branches sharing a common access node and each access node is for facilitating wireless interconnection between a device and the network; wherein the minimum separation distance ($d_1$) between an access node in the first branch and an access node in the second branch is greater than $K^{i/\alpha}d_0$, wherein $d_0$ is the separation distance between a transmitting node and a receiving node in the first branch, K is the signal-to-interference ratio (SIR) and $\alpha$ is the path loss exponential.

2. A wireless mesh network according to claim 1, wherein $d_0$ is the separation distance between the common access node and a first node in the first branch, the first node being most proximal to the common access node.

3. A wireless mesh network according to claims 2, wherein the network is adapted for indoor use and $d_1$ is greater than 1.7 $d_0$.

4. A wireless mesh network according to claim 1, further comprising a third branch of access nodes, and said third branch also shares the common access node; wherein the access nodes of said first second and third branches most proximal to said common access node are distributed on the vertices of a equilateral triangle with the common access node at the centre.

5. A wireless mesh network according to claim 1, further comprising a third branch of access nodes, and said third branch also shares the common access node; wherein each of the first second and third branches comprises a plurality of nodes distributed along a line, and the first second and third branches are separated by 120 degrees.

6. A wireless mesh network according to claim 3, further comprising a third branch of nodes, and said third branch also shares the common access node;
wherein each of the first second and third branches comprises a plurality of nodes distributed along a line, and the first second and third branches are separated by 120 degrees.

7. A wireless mesh network according to claim 1, further comprising a third branch of nodes, and said third branch also shares the common access node;
wherein the access nodes are distributed in Y shape.

8. A wireless mesh network according to claim 3, further comprising a third branch of nodes, and said third branch also shares the common access node;
wherein the access nodes are distributed in Y shape.

9. A wireless mesh network according to claim 5, wherein the access nodes of said first second and third branches most proximal to said common access node use non-overlapping channels for transmission.

10. A wireless mesh network according to claim 7, wherein the access nodes of said first second and third branches most proximal to said common access node use non-overlapping channels for transmission.

11. A wireless mesh network according to claim 9, wherein the access nodes of said first second and third branches most proximal to said common access node use non-overlapping channels for transmission.

12. A wireless mesh network according to claim 1, wherein the mesh network is adapted to operate at 5 GHz band.

13. A wireless mesh network according to claim 10, wherein the network is adapted to operate at over 20 Mbps multi-hop TCP throughput.

14. A wireless mesh network according to claim 11, wherein the network is adapted to operate at over 20 Mbps multi-hop TCP throughput.

15. A wireless mesh network according to claim 12, wherein the network is adapted to operate at over 20 Mbps multi-hop TCP throughput.

16. A wireless mesh network comprising a first branch of router nodes, a second branch of router nodes and a third branch of router nodes sharing a common router node; wherein the common router node is adapted to communicate with each of the first, second and third router braches using a different and non-overlapping radio channel; wherein each router branch comprises a first router node which is in radio communication with the common router node to form a first router leg section, and each of the three first router nodes is equally spaced from the common router node at a distance of $d_0$ and the first router leg sections of the three router branches are at equal an angular separation of 120 degrees to each other; and wherein distance ($d_1$) between adjacent first router nodes is $d_1 = 2 d_0 * \cos(\pi/6) = 1.731 d_0$.

17. A wireless mesh network according to claim 16, wherein each router branch comprises second router node which is in radio communication with the first router node of that branch to form a second router leg section; wherein the radio channels of the first and second leg sections of that router branch are different and non-overlapping, and that the radio channel of the second leg section is different to and non-overlapping with any of the radio channels of the first leg sections of the first, second and third router branches.

18. A wireless mesh network comprising a plurality of router branches, each router branch comprising a plurality of access nodes to facilitate wireless data interconnection, wherein adjacent router branches are connected to a common access;

and wherein the minimum separation distance ($d_1$) between an access node in a first branch and an access node in a second branch is greater than $K^{1/\alpha} d_0$, wherein $d_0$ is the separation distance between a transmitting node and a receiving node in the first branch, K is the signal-to-interference ratio (SIR) and $\alpha$ is the path loss exponential.

19. A wireless mesh network according to claim 18, wherein the plurality of router branches are deployed along the sides of a regular polyhedron.

\* \* \* \* \*